Patented Mar. 13, 1951

2,544,756

UNITED STATES PATENT OFFICE 2,544,756

Fe₂O₃—Cr₂O₃—CuO HYDROGENATION CATALYST

Howard R. Guest and Raymond W. McNamee, South Charleston, W. Va., assignors, by mesne assignments, to Union Carbide and Carbon Corporation, a corporation of New York No Drawing. Application August 7, 1944, Serial No. 548,510

4 Claims. (Cl. 252—470)

This invention is an improvement in processes for making phenyl methyl carbinol by hydrogenation of acetophenone. More particularly the invention provides a rapid catalytic process for hydrogenating acetophenone selectively to phenyl methyl carbinol with good yields and efficiencies. It includes, also, an improved iron-copper-chromium catalyst and a method of preparing the catalyst.

It is known that acetophenone may be hydrogenated to form phenyl methyl carbinol. Phenyl methyl carbinol is important as an intermediate in the production of styrene. According to one series of reactions, ethyl benzene may be oxidized to acetophenone, acetophenone hydrogenated to phenyl methyl carbinol, and the carbinol dehydrated to styrene. It is to be noted that in this series of reactions none of the reagents used or by-products formed in the main reactions are of the nature of difficulty removable impurities which may remain to adversely affect, even in traces, the quality of the ultimate product, styrene. The only by-product is water which is readily separated and, aside from the base material undergoing conversion to styrene or an intermediate, the only reagents are the readily available, low-cost materials, oxygen and hydrogen.

Although, in the reduction of acetophenone by hydrogen, the only product of the main reaction is phenyl methyl carbinol, not all catalysts are sufficiently selective in their action to form the main product to the exclusion of side reaction products. In some instances, the formation of products by side reaction may increase disproportionately with increase in catalytic activity or other conditions resulting in an increased rate of the main reaction.

Among possible side reaction products are ethyl benzene and cyclohexyl methyl carbinol. In the dehydration of phenyl methyl carbinol to styrene, any cyclohexyl methyl carbinol present therein would be simultaneously converted to vinyl cyclohexane while any ethyl benzene present would pass through unchanged. The boiling points of both vinyl cyclohexane and ethyl benzene lie so close to that of styrene that their separation from styrene by distillation is not easily accomplished. Although no difficulty is encountered in separating ethyl benzene from phenyl methyl carbinol in view of the wide difference in their boiling points, a somewhat different situation is presented by the high boiling cyclohexyl methyl carbinol which distills only about 14° C. below phenyl methyl carbinol at normal pressure, with even less difference at reduced pressures.

We have discovered that phenyl methyl carbinol may be produced selectively to the substantial exclusion of side-reaction products, by hydrogenating acetophenone in the presence of an iron-copper-chromium hydrogenation catalyst in which iron and copper are present in predominating amounts, computed on a metal basis.

The catalyst may conveniently be prepared by roasting a mixture of the hydroxides and carbonates of the metals to convert them to the oxides, and for this purpose roasting temperatures from 200° to 450° C. and roasting periods of from one to twelve hours, depending upon the temperature, may be used successfully. Usually, however, catalysts of good activity may be obtained by roasting the mixture at a temperature from about 250° to 350° C. for a period which need not exceed six hours. At temperatures of about 275° to 315° C. which are preferred, catalysts roasted for about three hours are more active than those roasted for a longer period. The decomposition of the carbonates to the oxides proceeds smoothly in contrast to the strongly exothermic decomposition accompanying the preparation of some catalysts heretofore proposed, and it may be carried out readily on a commercial scale.

In preparing the catalyst, a mixture of iron, chromium and copper hydroxides, carbonates, and basic carbonates suitable for roasting may be obtained by precipitation from an aqueous solution of the metals in the form of such soluble salts as the nitrates, acetates or the like. The precipitating agent may be an aqueous solution of sodium carbonate, ammonium carbonate or other soluble carbonate. This procedure has the advantage that the remaining salts formed by the metathesis are water-soluble and easily washed from the precipitate. Before converting the mixture to the oxides, it may be found desirable to wash the precipitate to remove water-soluble salts and subject the washed precipitate to a preliminary drying at a temperature of about 90° to 130° C. over a period of 10 to 20 hours approximately.

During the roasting procedure a very small amount of water-soluble chromates may be formed. It may be found advantageous to remove these before using the catalyst. This can be done by washing the powder on a filter or by lixiviation with hot water until the wash water shows a negative test for the chromate ion. The ordinary test is made with silver nitrate solution, a red precipitate indicating the presence of chromate.

The copper used in making the solutions is preferably of electrolytic grade and the iron of a purity equivalent to Armco Ingot. Similarly, the chromium salts should be of equivalent purity.

In carrying out a hydrogenation of acetophenone using the mixture of oxides as first obtained by decomposition of the hydroxides and carbonates, an induction period may be observed. During this induction period, the catalyst apparently undergoes a reduction with formation of water. Where it is desired to avoid the formation of water in hydrogenating the acetophenone, or where the hydrogenation is to be carried out in a continuous-type process, it may be advantageous first to heat the catalyst in the presence of hydrogen to activate it. For instance, after the precipitate has been converted to the oxides, a stream of hydrogen may be passed through the roasting kiln while the roasted material is maintained at an elevated temperature for several hours. The effluent gases may be passed through a condenser to liquefy the water vapor and when no more water is condensed, the activation may be considered to be completed. Another method of activating the mixed oxides includes suspending the roasted material in ethyl benzene and then heating the mixture with hydrogen under pressure. The water which is formed may be vented from the autoclave from time to time. In activating the catalyst by heating it in the presence of hydrogen, a temperature of 150° to 200° C. is preferred, but higher and lower temperatures may also be used.

Prior to activation the catalyst is not magnetic but it becomes magnetic upon activation. The diffraction patterns obtained with cobalt radiation in X-ray studies of the catalyst revealed lines corresponding to the patterns for magnetic oxide of iron ($Fe_3O_4$), copper, and cuprous oxide, $Cu_2O$. The grain sizes of all the constituents were very small.

After activation, the solid catalyst may be stored by covering it with acetophenone or ethyl benzene, for instance, to protect it. Slurries containing as much as 20 per cent by weight of solids may be handled and transferred conveniently.

For producing phenyl methyl carbinol selectively by hydrogenation of acetophenone, the most useful catalysts are those in which the copper and chromium are present, on a metal basis, in a proportion from about 71 to 109 parts of copper and about 8 to 17 parts of chromium per 100 parts of iron. Using such a catalyst, the hydrogenation not only proceeds at a high rate with negligible amounts of ring hydrogenation and ethyl benzene formation, but the reaction may also be carried out at temperatures and pressures which are low in comparison with those which are employed in hydrogenation processes generally; and phenyl methyl carbinol is obtained in good yield. The catalyst is characterized also by its good stability and resistance to catalyst poisons. It has the additional advantage that it may be prepared with relative ease from raw materials of relatively low cost.

Catalysts containing about 95 to 96 parts of copper and from about 8 to 17 parts of chromium per 100 parts of iron are superior in activity to those having a higher or lower proportion of chromium. Similarly, catalysts containing about 10.5 to 14.5 parts of chromium (1/16 to 1/15 of the total amount of copper and iron) and from about 71 to 109 parts of copper per 100 parts of iron are superior to those having a higher or lower proportion of copper to iron. Our best results were obtained with catalysts in which copper and chromium were present in a ratio of about 95 to 96 parts of copper (46 per cent) and about 12 to 13 parts of chromium (6 per cent) per 100 parts of iron (48 per cent), on a metal basis.

To assist in the removal of the catalyst from the hydrogenation product, other materials such as diatomaceous earth, kaolin, fuller's earth and the like may be incorporated in the catalyst, for instance, by adding them to the salt solution prior to precipitation of the mixture of the carbonates of the metals. Such materials may also serve to extend the catalyst and enhance the activity of the active constituents.

The hydrogenation may be carried out at an elevated temperature and under hydrogen pressure in a conventional pressure reactor. In general, from about 0.5 to 10 parts of catalyst per 100 parts of acetophenone are suitable in carrying out the reaction, but an excess of catalyst is not of itself objectionable. Depending largely upon the catalyst concentration, the hydrogenation may be carried out using hydrogen pressures as low as 50 to 100 p. s. i. and at temperatures ranging from 130° to 175° C. (By the symbol p. s. i. as used herein is meant pounds per square inch, gage.) Higher pressures and temperatures may be used if desired, but ordinarily it is unnecessary to resort to pressures much above 150 to 200 p. s. i. or to temperatures substantially higher than 200° C. On the other hand, at temperatures of about 120° to 125° C. or below, the rate of hydrogenation may become too slow to be practicable, except possibly at high hydrogen pressure or high catalyst concentration. The hydrogenation may be carried out in a continuous manner by spraying a mixture of acetophenone and catalyst into an atmosphere of hydrogen under suitable pressure. The catalyst may be recovered by filtering, settling and the like, after hydrogenation is completed; and reused. It may readily be reactivated, if need be, by procedures including steaming and roasting, for instance.

In addition to being very selective the iron-copper-chromium catalysts are more active than other catalysts in the hydrogenation of acetophenone to phenyl methyl carbinol. Moreover, they are more rugged and durable than catalysts which do not contain iron in the specified ratio. This is especially true at higher reaction temperatures and becomes evident in a striking way when the catalysts are used in a continuous process where high activity over a protracted period is essential to successful commercial operation.

The invention may be further illustrated by the following examples:

*Example 1*

A precipitate of the mixed carbonates of iron, copper and chromium was made by adding a saturated, aqueous solution of sodium carbonate to an aqueous solution containing 262 grams of chemically pure ferric nitrate nonahydrate, $$Fe(NO_3)_3 \cdot 9H_2O$$

26.5 grams of chromic nitrate nonahydrate, $$Cr(NO_3)_3 \cdot 9H_2O$$

and 121.7 grams of cupric nitrate trihydrate, $$Cu(NO_3)_2 \cdot 3H_2O$$

dissolved in 1.5 liters of distilled water. During the precipitation, the solution was maintained at a temperature of 50° C. and vigorously agitated. After filtering, the precipitate was lixiviated with three successive portions of water of 1.5 liters each, and air dried in an oven at 120° C., followed by roasting at a temperature of 290° C. for a period of 1.5 hours. The roasted material was then leached with boiling water in three successive portions of 0.4 liter each and activated by reducing it in an atmosphere of hydrogen for a period of three hours at a temperature of about 175° C. After purging the hydrogen from the reducing chamber with nitrogen, the activated material was transferred to a container filled with acetophenone and stored until used.

There were obtained 90 grams of activated catalyst which was found, by analysis, to contain 9.45 parts of chromium and 88.4 parts of copper per 100 parts of iron, by weight.

*Example 2*

Following the procedure of Example 1, a catalyst was made using 54.2 grams of ferrous sulfate heptahydrate; $FeSO_4 \cdot 7H_2O$; 11.5 grams of chromic nitrate nonahydrate, and 39.3 grams of cupric nitrate trihydrate.

The activated catalyst which was obtained analyzed 13.1 parts of chromium and 94.5 parts of copper per 100 parts of iron.

*Example 3*

A catalyst was made according to the procedure of Example 1, starting with pure iron (Armco Ingot), pure copper (electrolytic bus bar scrap) and commercial chromium acetate solution (12 per cent $Cr_2O_3$).

The activated catalyst was found, by analysis, to contain 9.45 parts of chromium and 88.4 parts of copper per 100 parts of iron.

*Example 4*

From 11.5 grams of chromic nitrate nonahydrate, 39.3 grams of cupric nitrate trihydrate and 78.5 grams of ferric nitrate nonahydrate, a catalyst was prepared according to the method of Example 1. Additionally, 30 grams of fuller's earth which had been washed previously with nitric acid were suspended in the aqueous solution prior to the precipitation of the mixed carbonates of the metals.

The resulting catalyst was found to contain 95.2 parts of copper and 13.1 parts of chromium per 100 parts of iron.

*Example 5*

Into a stainless steel drum were charged 17.7 parts of a solution containing 13.6 per cent iron in the form of ferric nitrate; 17.55 parts of a solution containing 13 per cent copper in the form of cupric nitrate; 3.75 parts of chromium acetate solution containing the equivalent of 12 per cent of chromium trioxide ($Cr_2O_3$); and 60 parts of water. The temperature of the charge was maintained at 90° to 100° C. and a ten per cent solution of aqueous sodium carbonate added continuously until the mixture reacted basic to phenolphthalein. The total amount of sodium carbonate solution was 130 parts, and about one hour was required for the addition. After the stirring had been continued for about one-half hour with the temperature maintained at 90° to 100° C., the resulting precipitate of carbonates and basic carbonates was permitted to settle for several hours. About one third of the supernatant liquid could be decanted as clear liquor, and the remainder was removed by filtration. The solids obtained by filtration were charged into a rotating drum of suitable size, a small stream of air was then passed through the drum and the temperature brought as quickly as possible to 300° C. The roasting of the precipitates was continued for two hours at a temperature maintained at 300° to 325° C. The catalyst thus obtained was then leached five times with successive portions of water of about 60 to 65 parts each, and the leached catalyst charged to the roasting drum where it was dried in a current of air for about one-half hour at a temperature of 120° C. The catalyst was then passed through a 30 mesh sieve. A mixture of ethyl benzene and the powdered catalyst (10 per cent catalyst) was then charged into an autoclave where it was heated to about 175° C. in the presence of hydrogen maintained at a pressure of 75 p. s. i. Water formed in the activation of the catalyst was removed by venting the autoclave to about 25 p. s. i. at intervals of 30 minutes. At the end of three hours no more hydrogen was absorbed, indicating that the activation had been completed. The activated catalyst thus obtained was used in the hydrogenation of acetophenone. The catalyst had good activity and converted acetophenone selectively to phenyl methyl carbinol to the exclusion of side-reaction products.

Acetophenone was hydrogenated to phenyl methyl carbinol, using catalysts prepared in accordance with the foregoing examples. In each of the runs the charge comprised 200 parts, by weight, of an acetophenone-phenyl methyl carbinol mixture containing from about 80 to 90 per cent of acetophenone to which was added from 4 to 10 parts, by weight, of catalyst. The charge was placed in a suitable autoclave and maintained at a temperature of about 145° to 150° C. while hydrogen was introduced under a pressure of about 150 p. s. i. At the completion of the runs the catalyst was permitted to settle and was filtered from the product, and the per cent of acetophenone and ethyl benzene determined. Data for a number of runs is given in Table A.

*Table A*

| Charge | | Catalyst Composition [2] | | Temp., ° C. | Pressure, p. s. i. | Time, Hours | Product | | Rate of Hydrogenation, per cent of charge per hour |
|---|---|---|---|---|---|---|---|---|---|
| Acetophenone, per cent | Catalyst [1] | Cu | Cr | | | | Acetophenone, per cent | Ethyl Benzene, per cent | |
| 80.3 | 1 | 95.8 | 12.5 | 145 | 145 | 7.0 | 26.7 | 0.1 | 7.7 |
| 80.3 | 1 | 95.8 | 12.5 | 175 | 135 | 3.3 | 18.5 | 0.8 | 18.7 |
| 80.3 | 4 | 95.8 | 12.5 | 145 | 140 | 1.8 | 19.5 | 0.2 | 33.8 |
| 80.3 | 4 | 95.8 | 12.5 | 145 | 140 | 1.8 | 5.4 | 4.6 | 41.6 |
| 80.3 | 4 | 95.8 | 12.5 | 178 | 135 | 0.9 | 22.4 | 4.7 | 64.4 |
| 80.3 | 20 | 95.8 | 12.5 | 143 | 135 | 0.9 | 18.4 | 0.9 | 68.8 |
| 80.3 | 20 | 95.8 | 12.5 | 120 | 140 | 2.1 | 13.8 | 0.2 | 31.7 |
| 80.3 | 4 | 95.8 | 12.5 | 100 | 950 | 1.8 | 12.9 | 0.2 | 37.5 |
| 84.0 | 5 | 95.8 | [3] 12.5 | 147 | 150 | 3.6 | 22.4 | --- | 17.1 |
| 84.0 | 5 | 95.8 | [4] 12.5 | 147 | 150 | 4.0 | 7.3 | --- | 19.2 |
| 84.0 | 5 | 95.8 | [5] 12.5 | 148 | 150 | 5.0 | 12.2 | --- | 14.3 |

[1] Parts per 200 parts of charge.
[2] Parts per 100 parts of iron.
[3] Included also 208.3 parts of diatomaceous earth.
[4] Included also 208.3 parts of fuller's earth.
[5] Included also 208.3 parts of kaolin.

A number of runs were also made in which a catalyst was used over and over again. In each of the runs 230 parts of a supported catalyst were used per 200 parts of a charge which was a mixture of acetophenone and phenyl methyl carbinol. The catalyst had the following composition on a metal basis by weight: iron, 100 parts; copper, 94.9 parts; chromium, 13.3 parts; and silica ("Filtros" silica type), 1843 parts.

Data for these runs illustrating the durability of the iron-copper-chromium mixed oxide catalyst are given in Table B.

*Table B*

| Aceto-phenone in charge, per cent | Temp., °C. | Pressure, p. s. i. | Time, Hours | Product | | Rate of Hydrogenation, per cent of charge per hour |
|---|---|---|---|---|---|---|
| | | | | Aceto-phenone, per cent | Ethyl Benzene, per cent | |
| 94.5 | 150 | 150 | 4.0 | 9.8 | --- | 21.2 |
| 94.5 | 150 | 150 | 4.0 | 3.2 | --- | 23.8 |
| 94.5 | 150 | 150 | 3.0 | 2.5 | --- | 30.7 |
| 79.0 | 150 | 150 | 3.5 | 6.0 | --- | 20.9 |
| 79.0 | 150 | 150 | 3.0 | 5.7 | --- | 24.4 |
| 79.0 | 146 | 150 | 4.5 | 15.6 | --- | 14.1 |
| 79.0 | 152 | 150 | 4.5 | 3.8 | --- | 16.7 |
| 79.0 | 152 | 150 | 3.5 | 32.7 | --- | 13.2 |
| 79.0 | 152 | 150 | 5.0 | 12.8 | --- | 13.2 |
| 79.0 | 152 | 150 | 4.5 | 13.7 | --- | 14.5 |
| 79.0 | 150 | 150 | 5.5 | 10.4 | --- | 12.5 |
| 79.0 | 155 | 150 | 4.0 | 14.0 | --- | 16.2 |

The invention is susceptible of modification with the scope of the appended claims.

We claim:

1. A mixed oxides hydrogenation catalyst consisting essentially of the oxides of iron, copper and chromium, said iron and copper being present in a ratio of about 71 to 109 parts of copper and about 8 to 17 parts of chromium per 100 parts of iron, computed on a metal basis by weight.

2. A mixed oxides hydrogenation catalyst consisting essentially of the oxides of iron, copper and chromium, said copper and chromium being present in a ratio of about 71 to 109 parts of copper and about 10.5 to 14.5 parts of chromium per 100 parts of iron, computed on a metal basis by weight.

3. A mixed oxides hydrogenation catalyst consisting essentially of the oxides of iron, copper and chromium, said copper and chromium being present in a ratio of about 95 to 96 parts of copper and about 8 to 17 parts of chromium per 100 parts of iron, computed on a metal basis by weight.

4. A mixed oxides hydrogenation catalyst consisting essentially of the oxides of iron, copper and chromium, said copper and chromium being present in a ratio of about 95 to 96 parts of copper and about 12 to 13 parts of chromium per 100 parts of iron, computed on a metal basis by weight.

HOWARD R. GUEST.
RAYMOND W. McNAMEE.

REFERENCES CITED

The following references are of record in the file of this patent:

UNITED STATES PATENTS

| Number | Name | Date |
|---|---|---|
| 2,040,913 | Amend | May 19, 1936 |
| 2,047,945 | Arnold et al. | July 21, 1936 |
| 2,180,672 | Frey | Nov. 21, 1939 |
| 2,293,774 | Soday | Aug. 25, 1942 |
| 2,303,075 | Soday | Nov. 24, 1942 |
| 2,323,868 | Hughes | July 6, 1943 |
| 2,384,562 | Stowe | Dec. 5, 1944 |
| 2,401,246 | Hull | May 28, 1946 |